US009795018B2

(12) United States Patent
Kuo et al.

(10) Patent No.: US 9,795,018 B2
(45) Date of Patent: *Oct. 17, 2017

(54) ELECTRONIC DEVICE AND CIRCUIT MODULE THEREOF

(71) Applicant: ALSON TECHNOLOGY LIMITED, Kowloon OT (HK)

(72) Inventors: Chi-Fen Kuo, Hsinchu County (TW); Han-Hung Cheng, Hsinchu County (TW)

(73) Assignee: Alson Technology Limited, Kowloon (HK)

( * ) Notice: Subject to any disclaimer, the term of this patent is extended or adjusted under 35 U.S.C. 154(b) by 141 days.

This patent is subject to a terminal disclaimer.

(21) Appl. No.: 14/881,690

(22) Filed: Oct. 13, 2015

(65) Prior Publication Data
US 2016/0212824 A1 Jul. 21, 2016

(30) Foreign Application Priority Data

Jan. 20, 2015 (TW) .............................. 104101845 A

(51) Int. Cl.
H05B 41/28 (2006.01)
H05B 41/282 (2006.01)
G06F 3/06 (2006.01)
G06F 1/26 (2006.01)

(52) U.S. Cl.
CPC ........... *H05B 41/2828* (2013.01); *G06F 1/26* (2013.01); *G06F 3/06* (2013.01)

(58) Field of Classification Search
None
See application file for complete search history.

(56) References Cited

U.S. PATENT DOCUMENTS 4,805,175 A * 2/1989 Knowles .............. G06K 7/1098
235/462.21
4,860,194 A * 8/1989 Harrison ............... G06F 3/0601
360/902
4,864,468 A * 9/1989 Weiss ................. H05K 7/20545
174/16.3

(Continued)

FOREIGN PATENT DOCUMENTS

TW M456042 U 6/2013

*Primary Examiner* — Douglas W Owens
*Assistant Examiner* — Srinivas Sathiraju
(74) *Attorney, Agent, or Firm* — Muncy, Geissler, Olds & Lowe, P.C.

(57) ABSTRACT

An electronic device and circuit module thereof is provided. The circuit module includes a board, a boosting circuit and a plasma tube. The board has at least one through hole. The board is for being connected with a circuit board device with their thicknesswise sides opposite to each other. The boosting circuit is disposed on the board and includes at least one conductive path and a plurality of electronic components electrically connected to the at least one conductive path. The at least one conductive path includes a power input portion and two power output terminals. The power input portion is for being electrically connecting with a power output portion the circuit board device. At least one said electronic component is disposed within the through hole. Two opposite ends of the plasma tube have two electrodes electrically connected to the two power output terminals.

10 Claims, 5 Drawing Sheets

(56) References Cited

U.S. PATENT DOCUMENTS

| | | | | | |
|---|---|---|---|---|---|
| 4,970,461 | A * | 11/1990 | LePage | G01R 31/308 324/514 |
| 5,032,788 | A * | 7/1991 | Ringleb | G01R 31/309 324/501 |
| 5,036,481 | A * | 7/1991 | Lunsford | G06F 1/18 361/679.32 |
| 5,557,506 | A * | 9/1996 | Wood | H05K 7/1429 361/729 |
| 5,689,406 | A * | 11/1997 | Wood | H05K 7/1429 361/729 |
| 5,816,859 | A * | 10/1998 | Dubin | G06F 1/16 439/638 |
| 6,348,277 | B1 * | 2/2002 | Faris | H01M 6/5011 429/208 |
| 6,644,866 | B1 * | 11/2003 | Kusuda | G02B 6/3897 385/136 |
| 6,655,814 | B1 * | 12/2003 | Tagawa | G09F 13/04 362/145 |
| 6,988,026 | B2 * | 1/2006 | Breed | G07C 5/0808 701/31.4 |
| 7,154,174 | B2 * | 12/2006 | Maxwell | H01L 23/5385 257/691 |
| 8,988,867 | B2 * | 3/2015 | Kuroda | H05K 5/0017 349/58 |
| 9,013,367 | B2 * | 4/2015 | Cope | G09F 9/30 345/1.3 |
| 9,058,755 | B2 * | 6/2015 | Cope | G02F 1/133305 |
| 9,159,707 | B2 * | 10/2015 | Cope | G09F 9/30 |
| 9,326,620 | B1 * | 5/2016 | Cross | A47F 3/001 |
| 9,543,636 | B2 * | 1/2017 | Baringer | H01Q 21/28 |
| 2009/0128471 | A1 * | 5/2009 | Hsiao | G09G 3/3611 345/88 |
| 2011/0211061 | A1 * | 9/2011 | Kossin | H04N 5/2252 348/81 |
| 2011/0273906 | A1 * | 11/2011 | Nichol | G02B 6/0076 362/607 |
| 2013/0155723 | A1 * | 6/2013 | Coleman | G02B 6/0018 362/621 |
| 2013/0310171 | A1 * | 11/2013 | Joko | G07F 17/3211 463/31 |
| 2014/0071032 | A1 * | 3/2014 | Kimura | G09G 3/3426 345/87 |
| 2015/0214195 | A1 * | 7/2015 | Cope | G09F 9/30 257/89 |
| 2015/0247627 | A1 * | 9/2015 | Cope | G02F 1/133305 362/249.08 |
| 2015/0317121 | A1 * | 11/2015 | Cope | G09F 9/33 345/1.3 |
| 2016/0371047 | A1 * | 12/2016 | Cope | C23C 14/562 |

* cited by examiner

ELECTRONIC DEVICE AND CIRCUIT MODULE THEREOF

BACKGROUND OF THE INVENTION

Field of the Invention

The present invention relates to an electronic device and circuit module thereof.

Description of the Prior Art

Usually, a circuit module of an electronic device includes a circuit board, a plurality of electronic components and a connection port. The electronic components are welded on the circuit board directly, and the connection port is electrically connected with the circuit board and can be assembled to a computer mother board; therefore, when the circuit module is assembled to the mother board, power of the mother board is transmittable to the circuit module for the circuit module to use. Such circuit module is disclosed in TWM456042.

However, the electronic components of this type of circuit module are stuck on the circuit board directly. Some of the electronic components may have greater thickness; therefore, when the electronic components which have greater thickness are disposed on the circuit board, the circuit module may be too thick. In addition, a distance between each insert slot of each mother board is specified, so a thickness of the electronic device inserted into the insert slot needs to be meet the specification. If the circuit module is covered by other shells and inserted into the mother board, the circuit module occupies a great portion of space, and some parts of the insert slots may be left unused.

The present invention has arisen to mitigate and/or obviate the afore-described disadvantages.

SUMMARY OF THE INVENTION

The major object of the present invention is to provide an electronic device and circuit module thereof A board of the circuit module has at least one through hole, and at least one electronic component is disposed within the through hole; therefore, a thickness of the circuit module is decreased, the circuit module occupies less space when being inserted into a mother board, and more electronic devices are allowed to be inserted into the mother board.

To achieve the above and other objects, a circuit module is provided for being electrically connected with a circuit board device, and the circuit board device includes a power output portion. The circuit module includes a board, a boosting circuit and a plasma tube. The board has at least one through hole, and the board is for being connected with the circuit board device with thicknesswise sides of the board and the circuit board device opposite to each other; the boosting circuit is disposed on the board, the boosting circuit includes at least one conductive path and a plurality of electronic components which are electrically connected with the conductive path, the at least one conductive path includes a power input portion for being electrically connected with the power output portion and two power output terminals, and at least one said electronic component is disposed within the through hole; two opposite ends of the plasma tube have two electrodes which are electrically connected with the two power output terminals.

To achieve the above and other objects, an electronic device is further provided, including the above-mentioned circuit module, further including a circuit board device which is electrically connected with the circuit module. The circuit board device is connected with the board of the circuit module with the thicknesswise sides of the board and the circuit board device opposite to each other.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
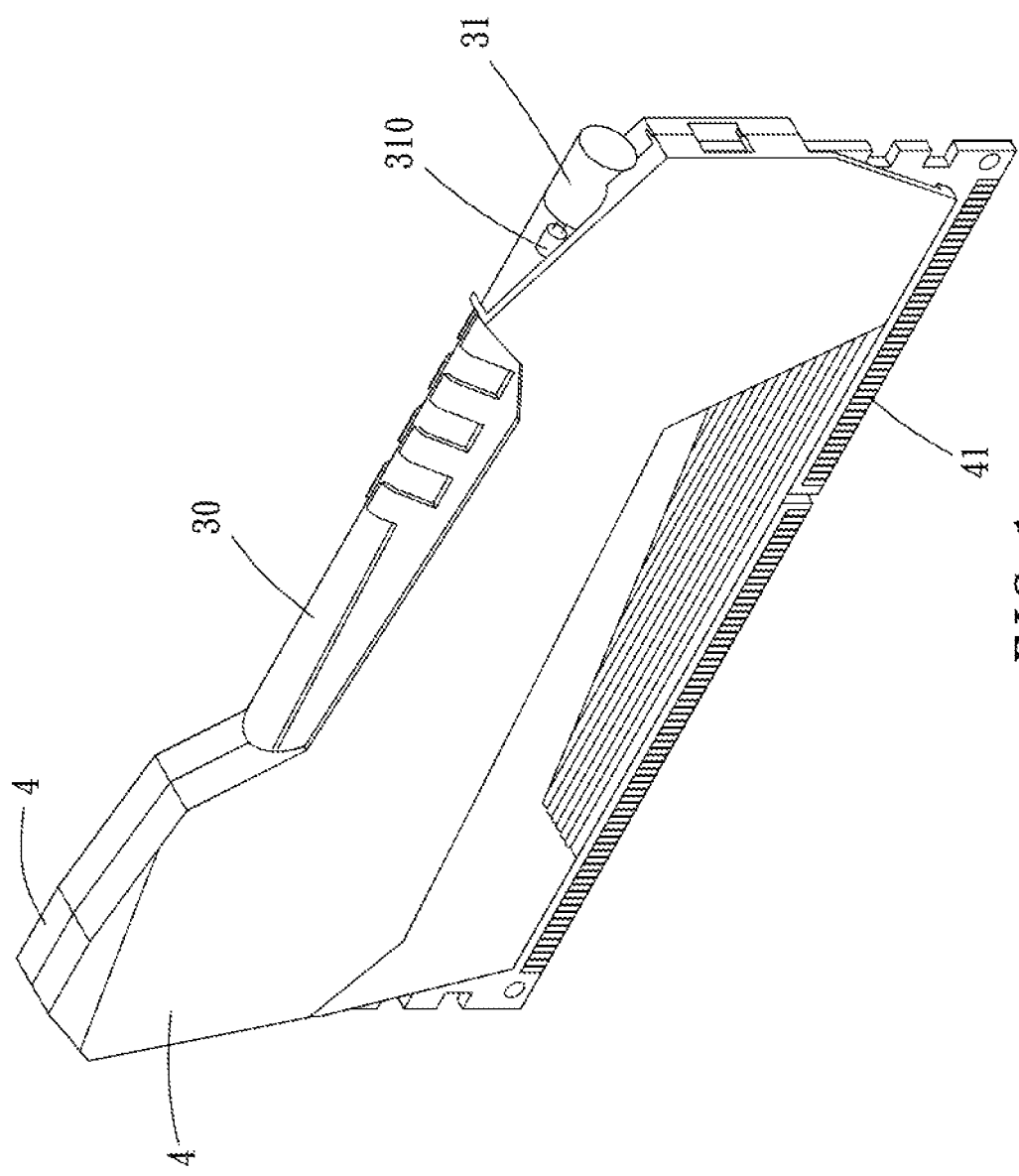
FIG. 1 is a perspective drawing of an electronic device of a preferred embodiment of the present invention.
Figure 2:
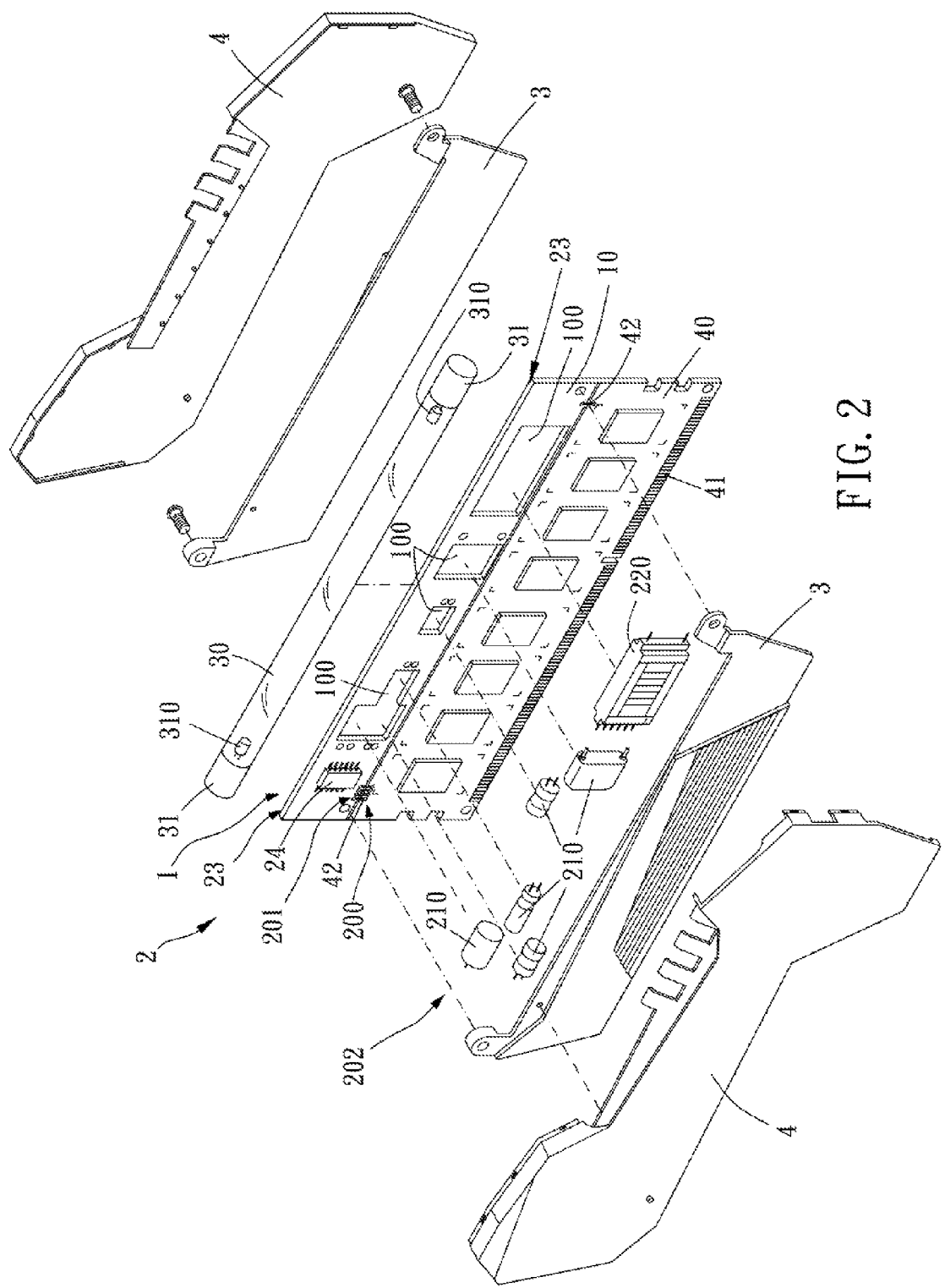
FIG. 2 is a breakdown drawing of the electronic device of the preferred embodiment of the present invention.
Figure 3:
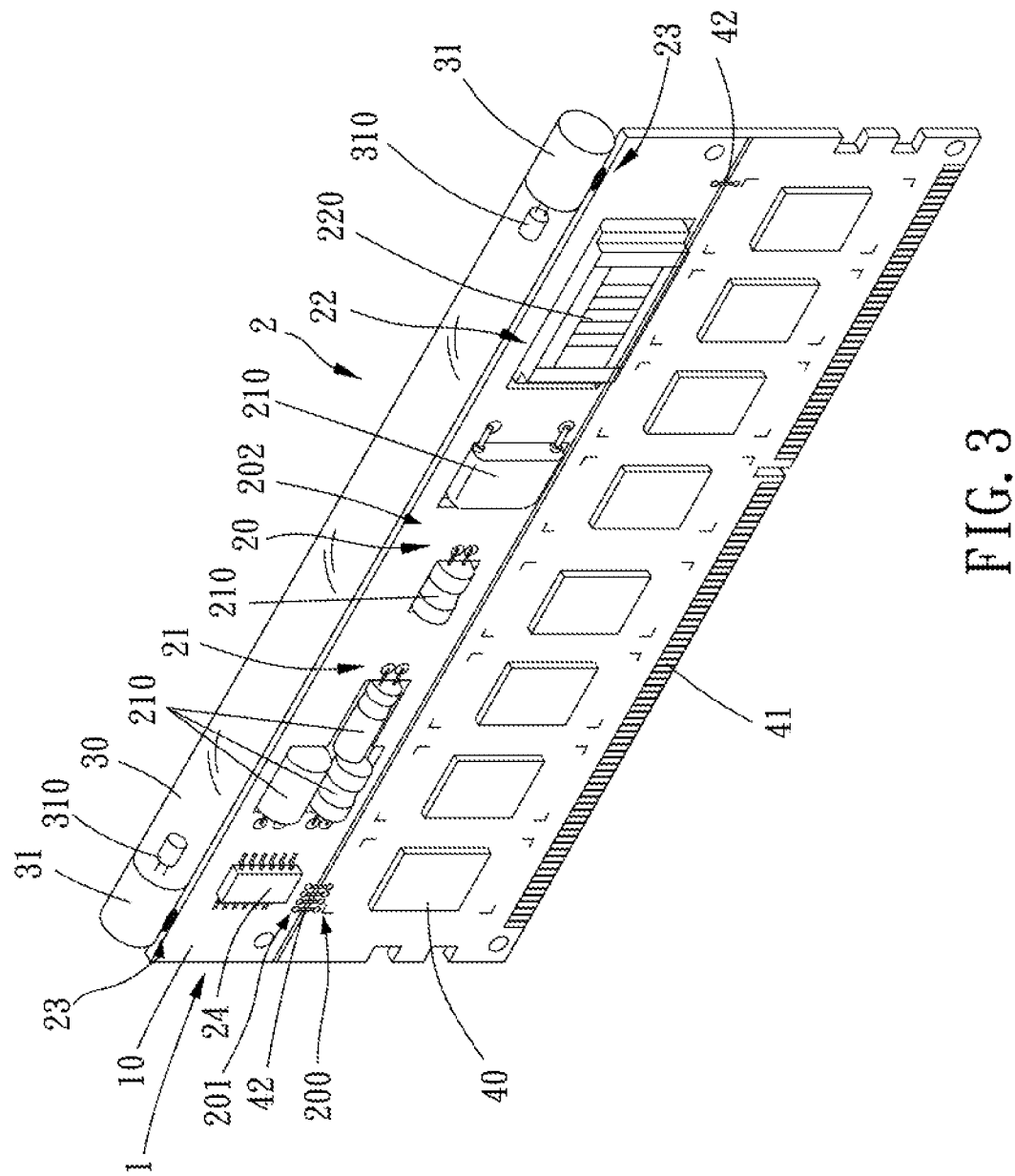
FIG. 3 is a drawing showing a combination of a circuit module and a circuit board device of the preferred embodiment of the present invention.
Figure 4:
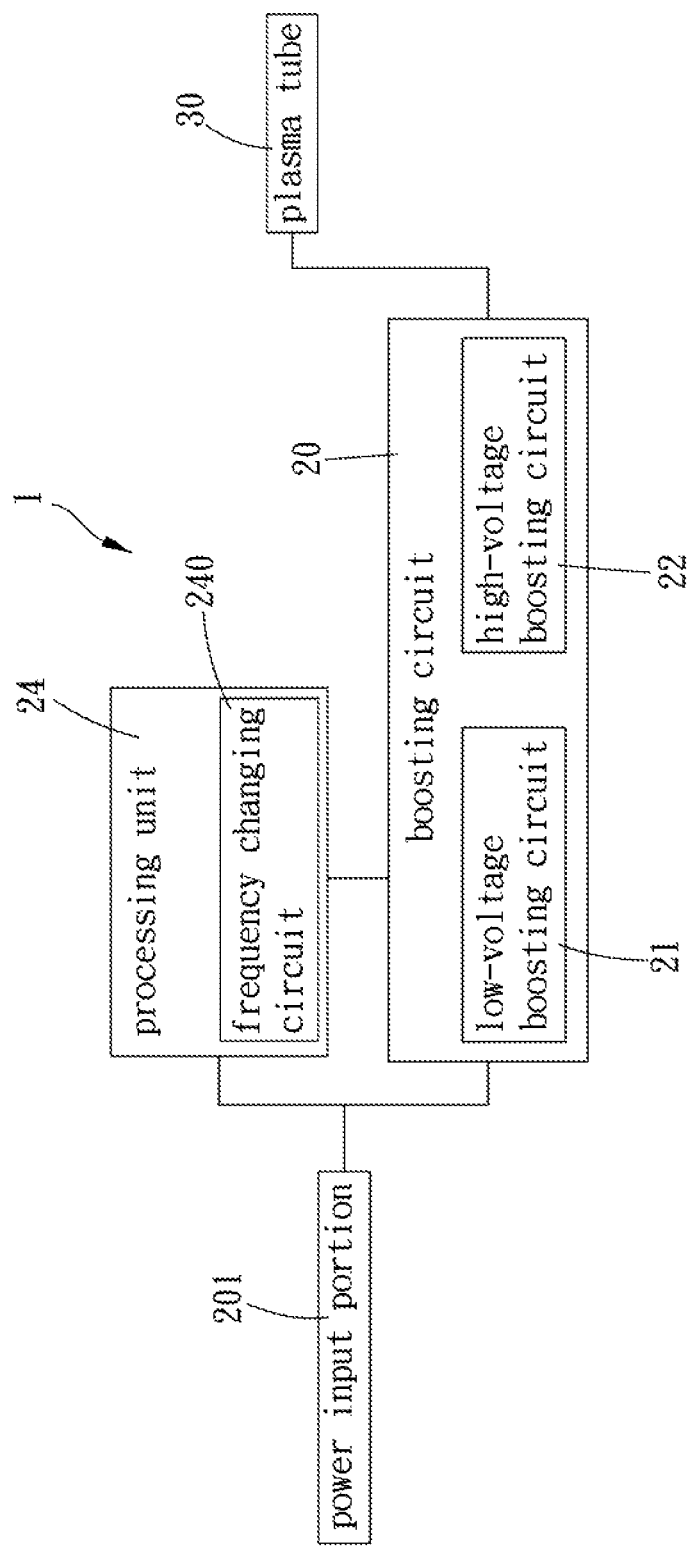
FIG. 4 is a block diagram showing a structural relation of the circuit module of the preferred embodiment of the present invention.

The present invention will be clearer from the following description when viewed together with the accompanying drawings, which show, for purpose of illustrations only, the preferred embodiment in accordance with the present invention.

Please refer to FIGS. 1 to 4 for a preferred embodiment of the present invention. A circuit module 1 is provided for being electrically connected with a circuit board device 40, the circuit board device 40 includes a power output portion 200, and the circuit module 1 includes a board 10, a boosting circuit 20 and a plasma tube 30. Moreover, the boosting circuit 20 can transfer a low-voltage power input from the circuit board device into a high-voltage alternating current or a high-voltage pulse direct current for the plasma tube 30 to use to allow the plasma tube 30 to produce a plurality of flashing lightning.

The board 10 has at least one through hole 100 for an electronic component to be disposed therewithin, and the board 10 is provided for being connected with the circuit board device 40 with thicknesswise sides of the board 10 and the circuit board device 40 opposite to each other. In this embodiment, the board 10 has the plurality of through holes 100 so that each said electronic component can be disposed within each said through hole 100. It is understandable that the board may have only one through hole, and a plurality of electronic components are disposed therewithin; or the board may have only one through hole, and an electronic component which occupies greater space is inserted therein.

The boosting circuit 20 is disposed on the board 10, and the boosting circuit 20 includes at least one conductive path and a plurality of electronic components 202 which are electrically connected with the at least one conductive path. The at least one conductive path includes a power input portion 201 for being electrically connected with the power output portion 200 and two power output terminals 23, and at least one said electronic component 202 is disposed within the through hole 100. Specifically, the conductive path is buried in the board 10. In this embodiment, the board 10 and the conductive path form a printed circuit board; however, the conductive path may be disposed on the board in other ways. More specifically, the boosting circuit 20 can transfer a low-voltage direct current input from the power input portion 201 into the high-voltage alternating current, and then the high-voltage alternating current is transferred through the two power output terminals 23 to the plasma tube 30. It is understandable that the boosting circuit 20 can also transfer the low-voltage direct current into the high-voltage pulsed direct current. In this embodiment, the power input portion 201 is provided for being electrically connected with a memory (the circuit board device 40) which is formed with the power output portion 200, and the memory (the circuit board device 40) and the circuit module 1 after being engaged with each other occupy less space; and of course, the power input portion may also be electrically connected with a display card, a network card or a printed circuit board which is formed with the power output portion.

More specifically, the plurality of electronic components 202 include a plurality of passive components 210 and at least one transformer 220. The plurality of passive components 210 are electrically connected with one another to form a low-voltage boosting circuit 21 which is electrically connected with the power input portion 201 so that the low-voltage boosting circuit 21 can transfer a direct current supplied by the circuit board device 40 into an alternating current or a pulsed direct current. The at least one transformer 220 forms a high-voltage boosting circuit 22 which is electrically connected between the low-voltage boosting circuit 21 and the two power output terminals 23, and the high-voltage boosting circuit 22 can transfer a low-voltage power into a high-voltage power for the plasma tube 30 to use.

More specifically, the plurality of electronic components 202 further include a processing unit 24, and the processing unit 24 includes a frequency changing circuit 240 which is electrically connected with the power input portion 201 and the low-voltage boosting circuit 21. Through the frequency changing circuit 240, a power having a first frequency can be transferred into a power having a second frequency. Through switching the frequency, the plasma tube 30 can produce various rays in different shapes.

Figure 5:
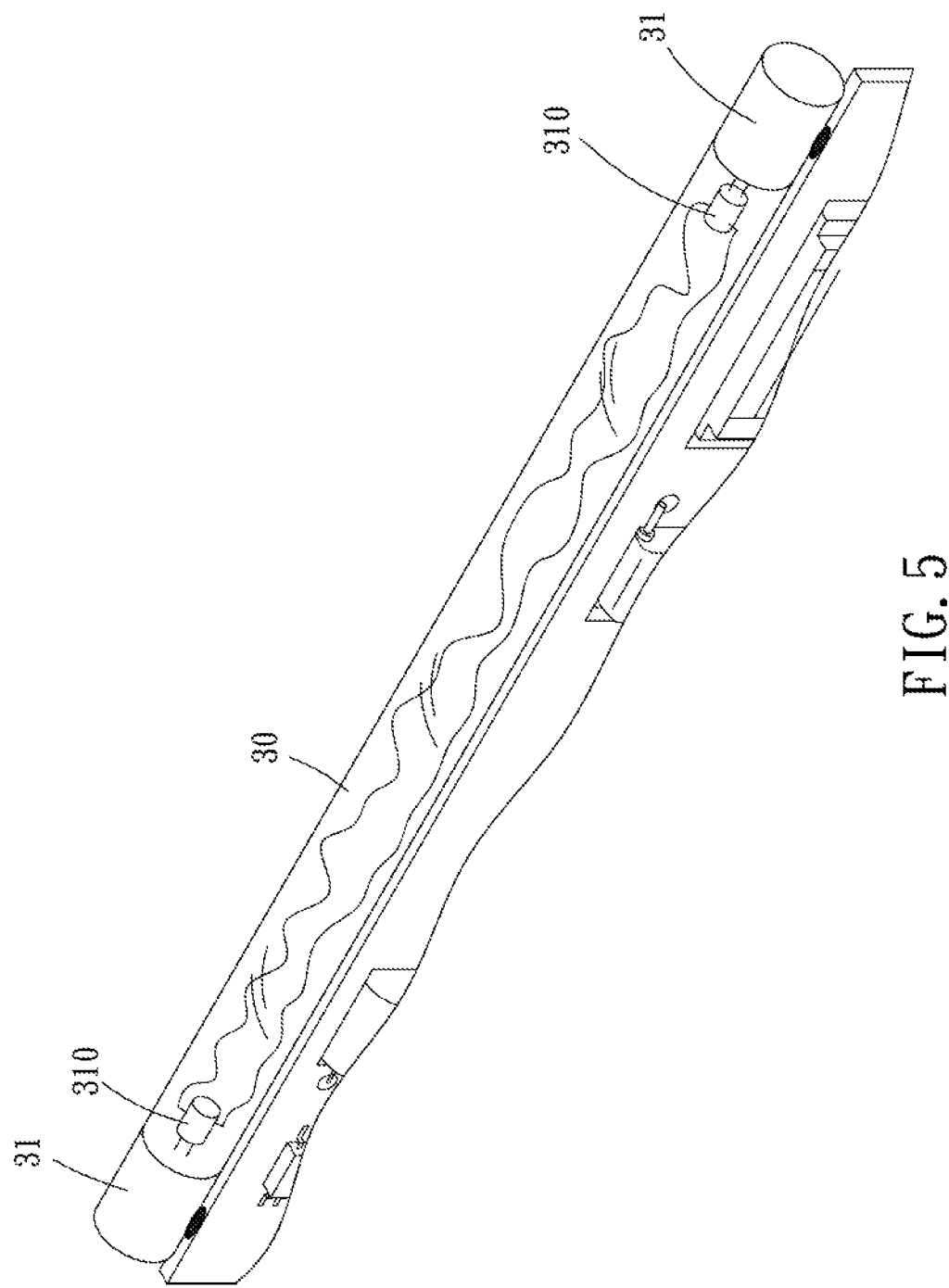
FIG. 5 is a partially-enlarged drawing of the electronic device of the preferred embodiment of the present invention.

Two opposite ends of the plasma tube 30 have two electrodes 31 electrically connected with the two power output terminals 23. Specifically, the plasma tube 30 has a low-pressure inert gas therein, and a fluorescent substance is spread on an inner wall of the plasma tube 30; therefore, when a high-voltage current goes through the plasma tube 30, the inert gas is ionized to produce lightning-shaped rays. More specifically, each said electrode 31 includes an electrode cap 310 which is located in the plasma tube 30 and is hollow, and the two electrode caps 310 are substantially coaxially arranged; therefore, the rays can be projected out along a circumferential edge of the electrode caps 310 and scattered (as shown in FIG. 5). Compared with a concentrated ray produced by a traditional electrode, the scattered rays are more pleasing to the eye.

An electronic device 2 is further provided, including an above-mentioned circuit module 1, further including a circuit board device 40 which is electrically connected with the circuit module 1. The circuit board device 40 is connected with the board 10 of the circuit module 1 with thicknesswise sides of the board 10 and the circuit board device 40 opposite to each other. In this embodiment, the circuit board device 40 is a memory, the circuit board device may be a display card, a network card or a printed circuit board, and the board of the circuit module and the circuit board device may be integrally formed.

The circuit board device 40 further includes an electric insert row 41 which is for being inserted into an electric insert slot of a computer mother board, and the electric insert row 41 is arranged on a side of the circuit board device 40 opposite to the circuit module 1. It is understandable that the electric insert row 41 may be an insert row which matches Peripheral Component Interconnect (PCI), Peripheral Component Interconnect Express (PCI-E) or other connection interfaces so as to transfer data between the circuit board device 40 and the computer mother board through the electric insert row 41.

At least one bridging member 42 is further connected with between the circuit board device 40 and the board 10 of the circuit module 1, each said bridging member 42 is arranged across the thicknesswise sides of the circuit board device 40 and the board 10 of the circuit module 1, and two ends of each said bridging member 42 are fixedly connected to the circuit board device 40 and the board 10 of the circuit module 1 respectively. It is understandable that a portion of the bridging member 42 can serve as a conductive path for transferring a power of the circuit board device 40 to the circuit module 1.

The electronic device 2 further includes two heat-dissipating sheets 3, and the two heat-dissipating sheets 3 are arranged on two opposite sides of the electronic device 2. In addition, the two heat-dissipating sheets 3 are respectively arranged on a side of the circuit board device 40 so that heat produced during an operating process of the circuit board device 40 can be emitted out to prevent the electronic device 2 from being nonfunctional or damaged because of overheating. It is understandable that the electronic device 2 may be optionally formed with the heat-dissipating sheet. The electronic device 2 further includes at least one shell 4, and the shell 4 is engagedly connected with one of the heat-dissipating sheets 3 substantially in parallel on a side of the electronic device 2. In this embodiment, the electronic device 2 includes two said shells 4, and most part of the circuit module 1 and the circuit board device 40 are covered by the two shells 4 and the two heat-dissipating sheets 3 to prevent the circuit module 1 and the circuit board device 40 from being damaged. It is understandable that the shell may be made of a heat-dissipatable material so that the shell can dissipate heat. In other embodiments, the heat-dissipating sheet and the shell may be integrally formed and have the effect of decoration, protection and heat-dissipation.

Given the above, the circuit module has at least one through hole, and at least one said electronic component is disposed within the through hole; therefore, a thickness of the electronic device may be decreased, the electronic device occupies less space and more electronic devices are allowed to be inserted on the mother board.

While we have shown and described various embodiments in accordance with the present invention, it should be clear to those skilled in the art that further embodiments may be made without departing from the scope of the present invention.

What is claimed is:

1. A circuit module, provided for being electrically connected with a circuit board device, the circuit board device including a power output portion, the circuit module including:
   a board, having at least one through hole, the board provided for being connected with the circuit board device on a lateral side of the board;
   a boosting circuit, disposed on the board, including at least one conductive path and a plurality of electronic components which are electrically connected with the at least one conductive path, the at least one conductive path including a power input portion which is for being electrically connected with the power output portion and two power output terminals, at least one said electronic component being disposed within the through hole;

a plasma tube, two ends thereof having two electrodes which are electrically connected with the two power output terminals.

2. The circuit module of claim 1, wherein each said electrode includes an electrode cap which is located inside the plasma tube and is hollow, and the two electrode caps are substantially coaxially arranged.

3. The circuit module of claim 1, wherein the power input portion is for being electrically connected with a memory, a display card, a network card or a printed circuit board which is formed with the power output portion.

4. The circuit module of claim 1, wherein the plurality of electronic components include a plurality of passive components and at least one transformer, the plurality of passive components are electrically connected with one another to form a low-voltage boosting circuit which is electrically connected with the power input portion, and the at least one transformer forms a high-voltage boosting circuit which is electrically connected between the low-voltage boosting circuit and the two power output terminals.

5. The circuit module of claim 4, wherein the plurality of electronic components further include a processing unit, and the processing unit includes a frequency changing circuit which is electrically connected with the power input portion and the low-voltage boosting circuit.

6. An electronic device, including a circuit module of claim 1, further including a circuit board device which is electrically connected with the circuit module, the circuit board device being connected with the board of the circuit module on the lateral sides of the board.

7. The electronic device of claim 6, wherein the circuit board device further includes an electric insert row which is provided for being electrically inserted into an electric insert slot of a computer mother board, and the electric insert row is arranged on a side of the circuit board device opposite to the circuit module.

8. The electronic device of claim 6, wherein at least one bridging member is connected with between the circuit board device and the board of the circuit module, each said bridging member is arranged across the lateral side of the board, and two ends of each said bridging member are fixedly connected to the circuit board device and the board of the circuit module respectively.

9. The electronic device of claim 6, further including two heat-dissipating sheets, the two heat-dissipating sheets arranged on two opposite sides of the electronic device.

10. The electronic device of claim 9, further including at least one shell, the shell engagedly connected with one of the heat-dissipating sheets substantially in parallel on a side of the electronic device.

\* \* \* \* \*